United States Patent

Heeringa

[11] Patent Number: 5,847,940
[45] Date of Patent: Dec. 8, 1998

[54] POWER-SUPPLY CIRCUIT

[75] Inventor: Schelte Heeringa, Drachten, Netherlands

[73] Assignee: U.S. Philips Corporation, New York, N.Y.

[21] Appl. No.: 757,526

[22] Filed: Nov. 27, 1996

[30] Foreign Application Priority Data

Nov. 27, 1995 [EP] European Pat. Off. ............. 95203250

[51] Int. Cl.[6] .................................................. H02M 3/335
[52] U.S. Cl. ............................................. 363/19; 320/140
[58] Field of Search .......................... 363/18, 19; 320/32, 320/39, 140, 131, 138

[56] References Cited

U.S. PATENT DOCUMENTS

| | | | |
|---|---|---|---|
| 4,652,984 | 3/1987 | van der Akker et al. ................ | 363/18 |
| 4,684,871 | 8/1987 | Plagge ...................................... | 320/21 |
| 4,965,506 | 10/1990 | Algra et al. ............................... | 320/23 |

Primary Examiner—Shawn Riley
Attorney, Agent, or Firm—F. Brice Faller

[57] ABSTRACT

In a self-oscillating power-supply circuit for charging a battery (B) the switching transistor (T2) is turned off if the voltage across the sensing resistor (R3) exceeds the threshold voltage of a zener diode (D5). Instead of the zener diode (D5) it is possible to use a switching transistor which is actuated when the current through the switching transistor exceeds a given value. A diode (D6) is arranged in series with the zener diode (D5) and can be short-circuited by means of a switch (T3) in order to switch the power-supply circuit from slow charging to rapid charging. A voltage sensor may be added to monitor the battery voltage and to eliminate the short-circuit of the diode (D6) when a given battery voltage is reached, as a result of which the power-supply circuit changes over to slow charging. A cascode transistor (T1) reduces the dissipation of the switching transistor (T2), protects the switching transistor (T2) against overvoltage and stabilizes the voltage on the supply terminal (N3) to which the starting resistor (R6) is connected. This allows an accurate dosing of the current during slow charging.

23 Claims, 10 Drawing Sheets

POWER-SUPPLY CIRCUIT

BACKGROUND OF THE INVENTION

The invention relates to a power-supply circuit for powering a load from an input voltage, which circuit comprises: a transformer having a primary winding and a secondary winding, a switching transistor having a control electrode and having a first main electrode and having a second main electrode which define a main current path of the switching transistor, which main current path is connected to the input voltage in series with the primary winding to pass a current through the primary winding; means for turning off the switching transistor if the current exceeds a predetermined value; a first diode connected, in series with the load to be powered, between a first terminal of the secondary winding and a second terminal of the secondary winding, the load to be powered being connected to the first terminal and the first diode being connected to the second terminal; a series arrangement of a capacitor and a first resistor, which series arrangement is connected between the second terminal and the control electrode; and a second resistor connected between the control electrode and a supply terminal.

Such a power-supply circuit is known from U.S. Pat. No. 4,684,871, particularly FIG. 1, and can be used for charging batteries and for powering electrical appliances. Such a power-supply circuit is particularly suitable for use in an electric shaver comprising rechargeable batteries, in which case the power-supply circuit supplies the charging current for the batteries and the supply current for the motor of the shaver. In the known power-supply circuit the switching transistor is a bipolar transistor. The second resistor supplies a starting current to the control electrode or base of the switching transistor, which is consequently turned on. This results in a current through the primary winding of the transformer. This primary current induces a voltage in the secondary winding, which is fed back in a positive sense to the base of the switching transistor by means of the series arrangement of the first capacitor and the first resistor. As a result of this, the switching transistor is rapidly saturated. During the forward interval the primary current increases linearly until the switching transistor is turned off. In the known power-supply circuit the primary current flows through a resistor arranged in the emitter lead of the switching transistor. The base-emitter junction of a transistor is connected across this resistor to short-circuit the base of the switching transistor if the voltage across the resistor exceeds a given value. In the flyback interval which then begins the energy stored in the transformer is transferred, via the first diode, to the load to be powered, causing a secondary current to flow in the secondary winding, which current decreases gradually. At the transition from the forward interval to the flyback interval the polarlity of the secondary voltage is reversed and again cut-off of the switching transistor is accelerated by positive feedback via the first capacitor and the second resistor. At the end of the flyback interval the first diode is turned off and a waiting interval begins, in which the voltage difference built up across the first capacitor is compensated via the second resistor until the drive voltage available on the base of the switching transistor is again sufficient to turn on this transistor. Thus, the power-supply circuit is self-oscillating.

This known power-supply circuit can operate with input voltages derived from the rectified the household a.c. or mains voltage. This gives rise to some problems. The nominal mains voltage can vary between 100 and 240 V a.c. The rectified voltage varies to the same extent and directly influences the waiting interval in which the voltage difference across the first capacitor is compensated for. The period of one oscillation cycle and hence the oscillation frequency therefore depend on the applied mains voltage. In its turn, the average value of the current supplied by the power-supply circuit is proportional to the oscillation frequency. Thus, it appears that the average output current is dependent upon the applied mains voltage. This is unfavorable when batteries are charged because these must be charged with a known current in order to avoid overcharging.

Moreover, the rectified mains voltage can be very high. A very large direct voltage appears across the switching transistor when it is turned off. The switching losses in the switching transistor as a result of finite switching times can therefore be substantial. Only special high-voltage transistors are rapid enough and can handle the dissipation which then occurs. It is an object of the invention to solve these and other problems.

SUMMARY OF THE INVENTION

To this end, the power-supply circuit of the type defined in the opening paragraph is characterized in that the circuit further comprises: a further transistor having a first main electrode coupled to the second main electrode of the switching transistor and to the second resistor, a second main electrode coupled to the primary winding, and a control electrode connected to receive a voltage which is stabilized with respect to variations in the input voltage.

The further transistor together with the switching transistor forms a cascade arrangement. When the cut-off point of the switching transistor is reached the voltage variation on the first main electrode of the further transistor is substantially larger than the voltage variation on the first main electrode of the switching transistor, so that the further transistor is turned off relatively rapidly in comparison with the switching transistor itself. The further transistor also limits the voltage across the switching transistor because a substantially constant voltage difference exists between the first main electrode and the control electrode of the further transistor. This reduces the dissipation in the switching transistor. The further transistor further supplies an actively buffered stabilized voltage to the second resistor and thus eliminates the influence of mains voltage variations on the waiting interval.

The further transistor has further advantages. The first main electrode of the further transistor carries a buffered stabilized voltage in the flyback interval when the switching transistor is not conductive. This is utilized in an embodiment which is characterized in that the power-supply circuit further comprises: a diode connected between the first main electrode of the first transistor and a further supply terminal, and a smoothing capacitor connected to the further supply terminal. The diode is cut off in the forward interval when the switching transistor conducts. In the flyback interval the further transistor charges the smoothing capacitor via the diode. Since the further transistor forms an active buffer for the stabilized voltage on its control electrode, a comparatively small smoothing capacitor will be adequate. The voltage on the smoothing capacitor can be used for powering additional electronic circuits. In a shaver such circuits can be, for example, a control unit, a display and a microprocessor.

The voltage on the control electrode of the further transistor can be stabilized in various manners. In one embodiment this is effected by means of a zener diode connected between the control electrode and a point of fixed potential, and a resistor between the control electrode and the input voltage.

Particularly if the further transistor is a bipolar transistor, the resistance via which the control electrode or base is connected to the input voltage may be too high to supply enough base current when the further transistor is turned on. Reducing the resistance leads to undesirable dissipation. In order to remedy this, an embodiment is characterized in that the power-supply circuit further comprises: a series arrangement of a diode and a resistor, which series arrangement is connected between the control electrode of the further transistor and the second terminal of the secondary winding. In the forward interval the second terminal supplies an additional drive signal to the control electrode of the further transistor via the diode and the resistor. In the flyback interval the voltage across the secondary winding is reversed. The diode is then cut off to prevent the voltage stabilization of the voltage on the control electrode from being disturbed.

In order to minimize the dissipation in the switching transistor the switching transistor should switch rapidly. Switching can be accelerated by means of an embodiment which is characterized in that a second capacitor is arranged in parallel with the first resistor. In the case of transients the second capacitor reduces the impedance between the second terminal of the secondary winding and the control electrode of the switching transistor.

The switching transistor can be turned off in various manners. For this purpose, a first variant is characterized in that the means for turning off comprise: a sensing resistor, arranged in series with the main current path of the switching transistor; and a further switching transistor, having a main current path connected between the control electrode of the switching transistor and a point of fixed potential, and having a control electrode connected to receive a control signal in response to a voltage difference across the sensing resistor. Such a sensing resistor and further switching transistor are known per se from the aforementioned U.S. Pat. No. 4,684,871.

For said purpose a second variant is characterized in that the means for turning off the switching transistor comprise: an integrator, coupled to the second terminal in order to generate an integrated signal; a further switching transistor, having a main current path connected between the control electrode of the switching transistor and a point of fixed potential, and having a control electrode connected to receive the integrated signal. Such an integrator and further switching transistor are known per se from the aforementioned U.S. Pat. No. 4,652,984. During the forward interval the secondary voltage is integrated. As soon as the integrated voltage exceeds a given value, the further switching transistor is turned on and short-circuits the control electrode of the switching transistor.

For said purpose a third variant is characterized in that the means for turning off the switching transistor comprise: a sensing resistor, arranged in series with the first main electrode of the switching transistor; and a threshold element to limit the voltage on the control electrode, the threshold element being connected between the control electrode and the first terminal.

A threshold element is to be understood to mean an element having a comparatively high impedance as long as the voltage across the element is below a given threshold voltage, and which has a comparatively low impedance when the voltage across the element exceeds the threshold voltage. During the forward interval the primary current increases linearly until the sum of the voltage drop across the sensing resistor and the voltage between the control electrode and the first main electrode has become equal to the threshold voltage of the threshold element. The threshold element is turned on and short-circuits the base of the switching transistor to a reference voltage, as a result of which the switching transistor is turned off.

The threshold element is arranged in parallel with the series arrangement of the first resistor and the junction between the control electrode and the first main electrode. Thus, the voltage across the load to be powered, for example, a battery has no influence on the cut-off point of the switching transistor in the case that this load is arranged in series with the sensing resistor. The threshold element preferably comprises a zener diode.

In the case of a varying input voltage the secondary voltage also varies, which is fed back to the control electrode of the switching transistor. When the zener diode breaks down a varying current flows though this zener diode and produces a varying zener voltage across the internal resistance of the zener diode. As a result, the cut-off point of the switching transistor also varies. However, zener diodes having a low internal resistance also tend to have a higher zener voltage of more than 5 V. This is undesirable if the secondary voltage of the transformer is low and if the dissipation caused by the voltage drop across the second resistor is required to be low.

This problem can be remedied by means of an embodiment which is characterized in that the threshold element comprises: a further series resistor, connected between the series arrangement of the first capacitor and the first resistor and the control electrode of the switching transistor; a first zener diode, connected to the control electrode of the switching transistor; and a second zener diode, connected to the control electrode of the switching transistor via the further series resistor.

An alternative solution to this problem is provided by another embodiment which is characterized in that the threshold element comprises: a series arrangement of a zener diode and a further series resistor, and a bipolar transistor having a base connected to a node coupling the zener diode and the further series resistor, and having a main current path arranged in parallel with the series arrangement of the zener diode and the further series resistor.

The repetition frequency of the oscillation cycle depends inter alia on the time required to compensate for the voltage difference across the first capacitor. By arranging a threshold element, particularly a zener diode, across the series arrangement of the sensing resistor and the junction between the control electrode and the first main electrode of the switching transistor, an additional conduction path is obtained, in addition to the conduction path through the third resistor, via which additional conduction path the voltage difference across the first capacitor can be compensated. Indeed, in the flyback interval the sign of the secondary voltage is reversed, and a current can flow through the zener diode, which then operates as a diode. This effect results in a substantial reduction of the time required to compensate for the voltage difference across the first capacitor. Consequently, the repetition frequency of the oscillation cycle increases, as a result of which the power-supply circuit supplies more energy per unit of time to the load or battery to be powered than previously. This can be taken into account in the design of the power-supply circuit. However, the effect can also be avoided by means of an embodiment which is characterized in that a second diode is arranged in series with the threshold element, which second diode conducts during limitation of the voltage on the control electrode of the switching transistor.

The second diode blocks the additional conduction path of the threshold element. The presence of the second diode has the additional advantage that the power-supply circuit can be constructed so as to allow switching between a comparatively high repetition frequency and a comparatively low repetition frequency. To this end, an embodiment of the power-supply circuit is characterized in that a switch is connected in parallel with the second diode to short-circuit the second diode.

The switch can be a normal electrical switch or a transistor switch. Thus, for charging batteries the power-supply circuit can be changed over from slow charging (switch open; second diode not short-circuited) to rapid charging (switch closed; second diode short-circuited). To prevent the batteries from being overcharged, an embodiment is characterized in that the power-supply circuit further comprises means for opening and closing the switch in response to a signal which is a measure of a condition of the load to be powered. The condition can be the voltage or temperature of a battery to be charged.

An embodiment in which the voltage across the load to be powered is monitored is characterized in that the second diode has a first electrode connected to the first terminal of the secondary winding and a second electrode to the threshold element, and the switch comprises: a first transistor having a first main electrode connected to the first terminal, a second main electrode coupled to the second electrode of the second diode, and a control electrode coupled to the second terminal of the secondary winding; a second transistor having a first main electrode connected to the first terminal, a second main electrode coupled to the control electrode of the first transistor, and a control electrode; and a voltage divider, connected across the load to be powered and having a tap connected to the control electrode of the second transistor.

The first transistor, which may be bipolar or unipolar (MOS), short-circuits the second diode in the flyback interval. The power-supply circuit now operates as a rapid charger. The second transistor is turned on at a given battery voltage and short-circuits the control electrode of the first transistor, as a result of which the short-circuit of the second diode is eliminated and the power-supply circuit automatically changes over to slow charging.

The availability of the first and the second transistor makes it possible to avoid the use of a zener diode and the resulting variation in the cut-off point of the switching transistor. For this purpose, an embodiment is characterized in that the threshold element comprises: a first bipolar transistor having an emitter connected to the first terminal, a collector coupled to the control electrode of the switching transistor, and a base coupled to the second terminal of the secondary winding; a second bipolar transistor having an emitter connected to the first terminal, a collector coupled to the base of the first bipolar transistor, and a base connected to the first terminal via a diode; and the power-supply circuit further comprises: a voltage divider, connected across the load to be powered and having a tap connected to the base of the second bipolar transistor.

The first and the second transistor are now bipolar transistors which in the forward interval, in combination with the diode that connects the base of the second bipolar transistor to the first terminal, form a threshold element having a threshold voltage which is the sum of the voltage across the diode and the collector-base voltages of the first and the second transistor. In the flyback interval the first and the second transistor operate as described hereinbefore.

The influence of varying input voltages can be reduced even further in an embodiment which is characterized in that the threshold element comprises: a first bipolar transistor having an emitter connected to the first terminal, a collector coupled to the control electrode of the switching transistor, and a base coupled to the second terminal of the secondary winding via a series resistor; a second bipolar transistor having an emitter connected to the first terminal, a collector coupled to the base of the first bipolar transistor via the series resistor, and a base, a third bipolar transistor of an opposite conductivity type, having an emitter connected to the first terminal, a collector coupled to the base of the first bipolar transistor, and a base; and the power-supply circuit further comprises: a voltage divider, connected across the load to be powered and having a tap connected to the base of the second bipolar transistor and to the base of the third bipolar transistor.

The previously mentioned diode has been replaced by a bipolar third transistor of an opposite conductivity type and a resistor has been added in series with the base of the first bipolar transistor. The series resistor enables the degree of compensation to be adjusted.

The change-over point from rapid charging to slow charging and vice versa can be influenced in various ways. To this end, an embodiment is characterized in that at least a part of the second resistor comprises a variable or adjustable resistor. As already stated, the third resistor has a substantial influence on the repetition frequency of the oscillation cycle, particularly in the slow-charging mode. By making the third resistor adjustable or variable it is possible to vary the supplied charging current.

An alternative embodiment is characterized in that the power-supply circuit comprises means for influencing the voltage on the tap of the voltage divider. As a result of this, the power-supply circuit will change over sooner or later than without said means.

BRIEF DESCRIPTION OF THE DRAWINGS

These and other aspects of the invention will be described and elucidated with reference to the accompanying drawings, in which.

DETAILED DESCRIPTION OF PREFERRED EMBODIMENTS OF THE INVENTION

Figure 1:
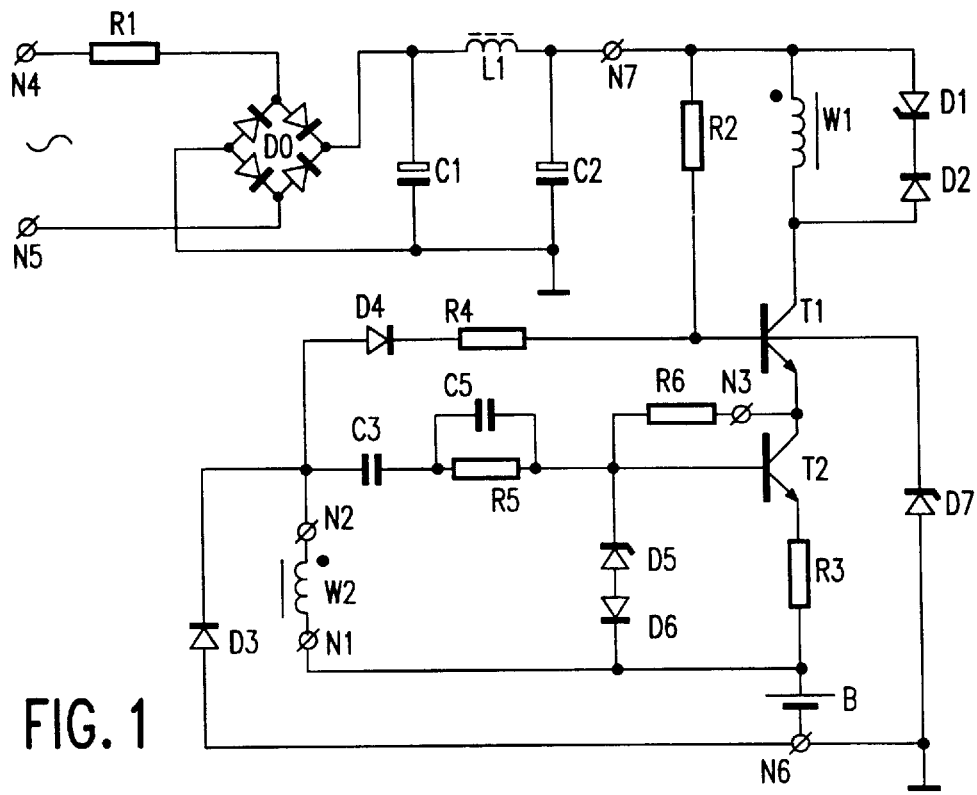
FIG. 1 shows a first embodiment of a power-supply circuit in accordance with the invention.

FIG. 1 shows a circuit diagram of a first embodiment of a power-supply circuit in accordance with the invention. The alternating mains voltage or a suitable direct voltage is applied to the input terminals N4 and N5. The alternating voltage is rectified by means of a diode bridge D0 and is smoothed and filtered by means of capacitors C1 and C2 and a coil L1. The negative terminal of the rectified input voltage is connected to ground. The positive terminal N7 is connected to a primary winding W1 of a transformer. A zener diode D1 and a diode D2 are arranged in parallel with the primary winding W1 and limit the voltage across the primary winding W1 when the current through the primary winding W1 is interrupted. The main current path of a switching transistor T2, comprising a bipolar NPN transistor, is connected in series with the primary winding W1, which transistor has its second main electrode or collector coupled to the primary winding W1. The first main electrode or emitter of the switching transistor T2 is connected to a first terminal N1 of a secondary winding W2 of the transformer via a resistor R3, which secondary winding is magnetically coupled to the primary winding W1. The secondary winding W2 further has its first terminal N1 connected to a load to be powered, which is for example a rechargeable battery B. The positive terminal of the battery B is connected to the first terminal N1 . The negative terminal of the battery B is connected to a terminal N6, which is connected to a second terminal N2 of the secondary winding W2 via a diode D3. The terminal N6 is, for example, connected to ground. As a result of this, not only the current through the secondary winding but also the current through the primary winding flow through the battery B. If this is not desirable, the first terminal N1 , instead of the terminal N6, may be connected to ground. The control electrode or base of the switching transistor is connected to a supply terminal N3 via a resistor R6. A series arrangement of a capacitor C3 and a resistor R5 is connected between the base of the switching transistor T2 and the second terminal N2 of the secondary winding W2. Furthermore, the switching transistor T2 has its base connected to the first terminal N1 via a threshold element comprising a zener diode D5 in series with a diode D6, which conducts when the zener diode D5 breaks down. A threshold element is to be understood to mean an element having a comparatively high impedance as long as the voltage across the element is below a given threshold voltage, and which has a comparatively low impedance when the voltage across the element exceeds the threshold voltage. This category includes the zener diode, the diac and the gas-filled regulator tube.

A speed-up capacitor C5 is arranged across the resistor R5 to speed up the turn-on of the switching transistor T2. Moreover, a cascade transistor T1 is arranged in series with the switching transistor T2, which cascade transistor is for example an NPN bipolar transistor having its emitter connected to the collector of the switching transistor T2, having its collector coupled to the primary winding W1 and having its base connected to the node between the supply resistor R2, which is connected to the positive terminal N7, and a zener diode D7, which is connected to the terminal N6 (ground). The supply terminal N3, to which the resistor R6 is connected, is formed by the emitter of the transistor T1. The supply terminal N3 supplies a stabilized voltage, which is determined by the zener diode D7 and which is actively buffered by the switching transistor T1. When the cut-off point of the switching transistor T2 is reached, the voltage variation on the emitter of the transistor T1 is much larger than the voltage variation on the emitter of the switching transistor T2. As a result, the transistor T1 is turned off rapidly in comparison with the switching transistor T2. The transistor T1 also limits the voltage on the collector of the switching transistor T2. This limits the dissipation in the switching transistor T2 and makes it possible to select a low-voltage type for this transistor.

When the input voltage is received a starting current will flow from supply terminal N3, via the resistor R6, to the base of the switching transistor T2, which is consequently turned on. The forward interval or forward phase begins. Now a current starts to flow from the positive terminal N7 to the terminal N6 via the primary winding W1, the switching transistor T2, the resistor R3 and the battery B. The voltage difference across the primary winding W1 induces a transformed voltage difference across the secondary winding W2, the second terminal N2 then being positive relative to the first terminal N1 . The cathode of the diode D3 is then positive relative to the anode of the diode D3, as a result of which the diode D3 is cut off. The positive voltage difference across the secondary winding W2 has a positive-feedback effect and drives the base-emitter junction of the switching transistor T2 further into conduction via the capacitor C3, the drive current being limited by the resistor R5. The switching transistor T2 is bottomed and an increasing current begins to flow through the primary winding W1. This increasing current produces an increasing voltage drop across the resistor R3. When the sum of the base-emitter-junction voltage of the switching transistor T2 and the voltage drop across the resistor R3 is equal to the threshold voltage of the threshold element, in the present case the sum of the zener voltage of the zener diode D5 and the junction voltage of the diode D6, the base of the switching transistor T2 is short-circuited to the first terminal N1. The switching transistor T2 is consequently turned off and the current through the primary winding W1 is interrupted. Now the flyback interval or flyback phase begins, in which the energy stored in the transformer is transferred to the battery B. The peak current at which the switching transistor T2 is turned off does not depend on the voltage across the battery B, because the threshold element has been arranged in parallel with the base-emitter junction of the switching transistor T2 and the resistor R3. Therefore, a short-circuited battery B or another load can never result in an excessive peak current through the switching transistor.

The interruption of the current through the primary winding W1 gives rise to a large voltage increase across the primary winding W1, which voltage increase is positive relative to the input voltage on the positive supply terminal N7 and which is limited by the diode D2 and the zener diode D1. As a result of the current interruption, the sign of the voltage across the primary winding W1 and, as a consequence, that of the voltage across the secondary winding W2 is reversed. The second terminal N2 of the secondary winding W2 is now negative relative to the first terminal N1. The diode D3 now conducts and a secondary current flows in the secondary circuit formed by the secondary winding W2, the diode D3 and the battery B, the energy in the transformer being transferred to the battery. The secondary current decreases to zero. As long as the diode D3 conducts, the negative voltage across the secondary winding W2 is equal to the sum of the voltage across the diode D3 and the voltage of the battery B. The negative voltage transient across the secondary winding W2 appears across the capacitor C3 and keeps the base of the switching transistor T2 negative relative to the emitter. The diode D6 prevents the capacitor C3 from being discharged via the zener diode D5, which is now poled in the forward direction. The switching transistor T2 will now remain cut off until the capacitor C3 has been recharged via the resistors R6 and R5 to such an extent that the voltage on the base of the switching transistor T2 is again sufficiently positive relative to the emitter and a new oscillation cycle is started. As a result of this, the power-supply circuit is self-oscillating.

The time necessary to charge the capacitor C3, and hence the repetition frequency of the oscillation cycle, is mainly determined by the resistance of the resistor R6 because in practice the resistance of the resistor R5 is negligible. The power-supply circuit waits until the capacitor C3 has been recharged sufficiently via the resistor R6. Thus, the flyback interval is followed by a waiting interval. A substantially fixed amount of energy is transferred to the battery B or to another load in each oscillation cycle. The repetition frequency of the oscillation cycle consequently determines the average charging current which flows into the battery B. The average charging current can be fixed by an appropriate choice of the resistance of the resistor R6. The power-supply circuit shown in FIG. 1 is particularly suitable as a slow charger or trickle charger for rechargeable batteries.

The charging process of the capacitor C3 is also determined by the positive voltage difference across the secondary winding W2 in the forward interval. This voltage difference is proportional to the input voltage on the positive supply terminal N7, which in its turn is proportional to the rectified mains voltage, which can vary from nominal 100 V to nominal 240 V. The higher the mains voltage, the longer it takes for the capacitor C3 to be charged. When the peak current at which the switching transistor T2 is turned off is reached more rapidly owing to a higher mains voltage, the charging time of the capacitor C3 becomes longer. As a result of this, the repetition frequency is adapted and a compensation for the varying mains voltage is obtained.

The switching transistor T2 is a bipolar transistor. However, alternatively other types of transistor can be used for this purpose. Examples of this include a Darlington transistor, a unipolar MOS transistor, whose first main electrode, second main electrode and control electrode correspond to the source, drain and gain, respectively, or an insulated gate bipolar transistor (IGBT).

During starting the transistor T1 receives base current via the resistor R2 and is turned on. The voltage on the supply terminal N3 is then stabilized by the zener diode D7. The switching transistor T2 is then remains cut off because the capacitor C3 must still be charged via the resistor R6. As soon as the switching transistor T2 is turned on, the voltage on the supply terminal N3 decreases because both transistors T1 and T2 are driven into saturation. The zener diode D7 is then cut off. After the switching transistor T2 has been turned off the zener diode D7 is turned on and the transistor T1 limits the collector voltage of the switching transistor T1 to a value determined by the zener voltage of the zener diode D7 and the base-emitter voltage of the transistor T.

The supply resistor R2 supplies the bias current for the zener diode D7 and its resistance is preferably selected to be as high as possible in order to minimize the dissipation. However, its resistance may be too high to supply enough base current to the transistor T1 when the switching transistor T2 draws current from the transistor T1. This is overcome by means of the diode D4 and the limiting resistor R4, which are connected in series between the second terminal N2 of the secondary winding W2 and the base of the transistor T1. Thus, the positive feedback of the positive voltage across the secondary winding W2 in the forward interval is also effective to drive the base of the transistor T1. In the flyback interval the voltage across the secondary winding W2 is reversed and becomes negative. The diode D4 is then cut off in order to prevent the voltage stabilization for the voltage on the base of the transistor T1 from being disturbed.

When the threshold voltage of the zener diode D5 is reached a current flows through the secondary winding W2, the capacitor C3, the resistor R5, the zener diode D5 and the diode D6. This current is dependent on the positive voltage appearing across the secondary winding in the forward interval. The positive voltage, in its turn, depends on the mains voltage. In the case of a high mains voltage the current through the zener diode D5 is consequently larger than in the case of a low mains voltage. The internal resistance of the zener diode D5 gives rise to a varying threshold voltage, as a result of which the cut-off point of the switching transistor T2 is dependent on the mains voltage. However, zener diodes having a low internal resistance are at the same time types having a higher zener voltage of more than 5 V. This is undesirable if the secondary voltage of the transformer is low for energizing batteries with low voltage and if the resistance value of the resistor R3 should be small in order to minimize the dissipation.

Figure 2:
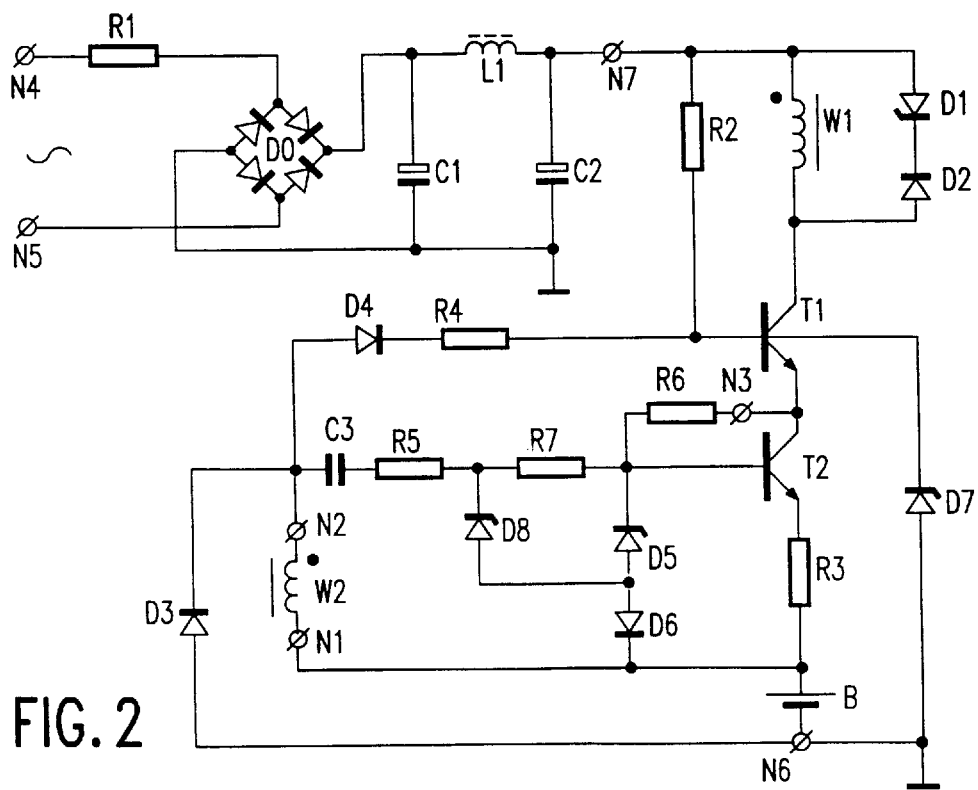
FIG. 2 shows a second embodiment of a power-supply circuit in accordance with the invention.

FIG. 2 shows a second embodiment comprising a threshold element having a smaller variation in threshold voltage. A resistor R7 is arranged between the resistor R5 and the base of the switching transistor T2. The node between the resistors R5 and R7 is connected to the anode of the diode D6 via an additional zener diode D8. The zener voltage of the additional zener diode D8 is higher than that of the zener diode D5. The additional zener diode D8 limits the voltage across the secondary winding W2 to a substantially constant value, so that the current through the zener diode D5 is substantially constant and its threshold voltage hardly depends on the mains voltage any longer. Thus, it is yet possible to select low-voltage types with a comparatively high internal resistance for the zener diodes D5 and D8.

Figure 3:
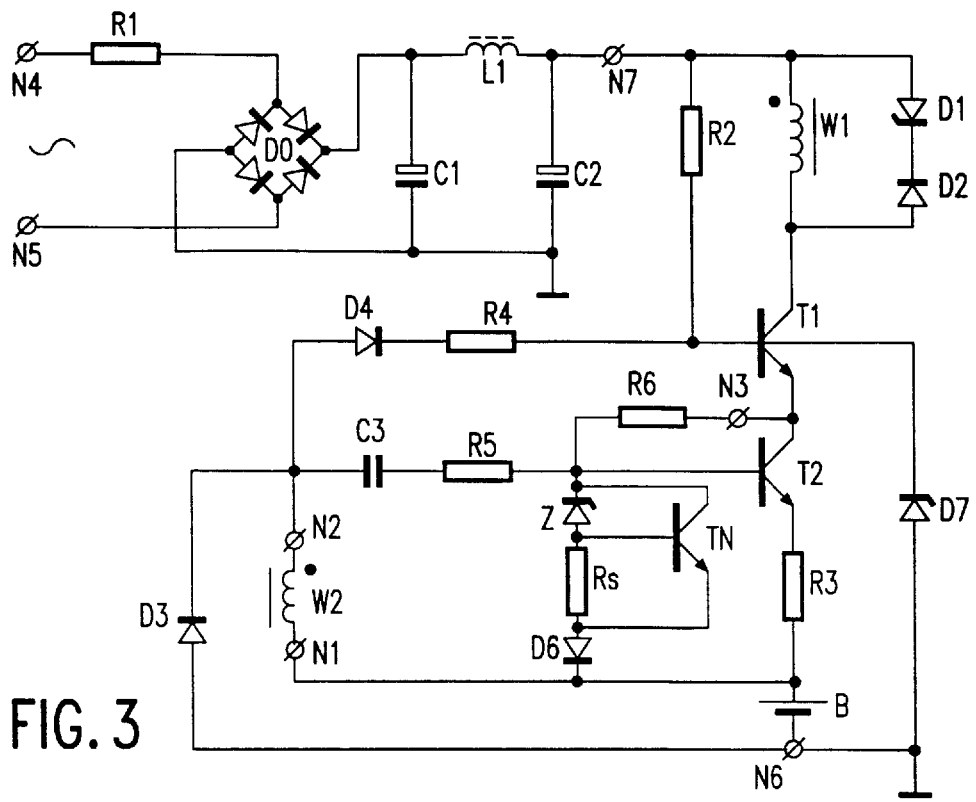
FIG. 3 shows a third embodiment of a power-supply circuit in accordance with the invention.

FIG. 3 shows a third embodiment using an alternative solution for the varying threshold voltage of the zener diode D5. The zener diode D5 has now been replaced by a zener diode Z in series with a resistor Rs. The collector-emitter path of an NPN transistor TN is arranged in parallel therewith, which transistor has its base connected to the node between the zener diode Z and the resistor Rs. The transistor TN handles most of the current which otherwise would flow through the zener diode Z. The base-emitter voltage of the transistor TN stabilizes the voltage drop across the resistor Rs and the current through the zener diode Z.

The zener diode D7 is connected to the terminal N6. This means that the voltage of the battery B is one of the factors which determine the stabilized voltage on the supply terminal N3, which stabilized voltage, as already explained, is a measure of the length of the waiting interval and the repetition frequency of the oscillation cycle. If the zener diode D7 had been connected to the positive terminal of the battery B, the waiting interval would have become independent of the battery voltage. However, by connecting the zener diode D7 to the negative terminal of the battery B, the power-supply circuit is protected against an interrupted or missing battery. In the case of an interrupted battery no current can flow through the switching transistor T2, as a result of which no base current flows to the transistor T1. The transistors T1 and T2 remain cut off, while the voltage on the supply terminal N3 is limited to a safe value for the switching transistor T2. Consequently, the transistor T2 cannot break down, which would be possible if the zener diode D7 had been connected to the positive terminal of the battery B.

Figure 4:
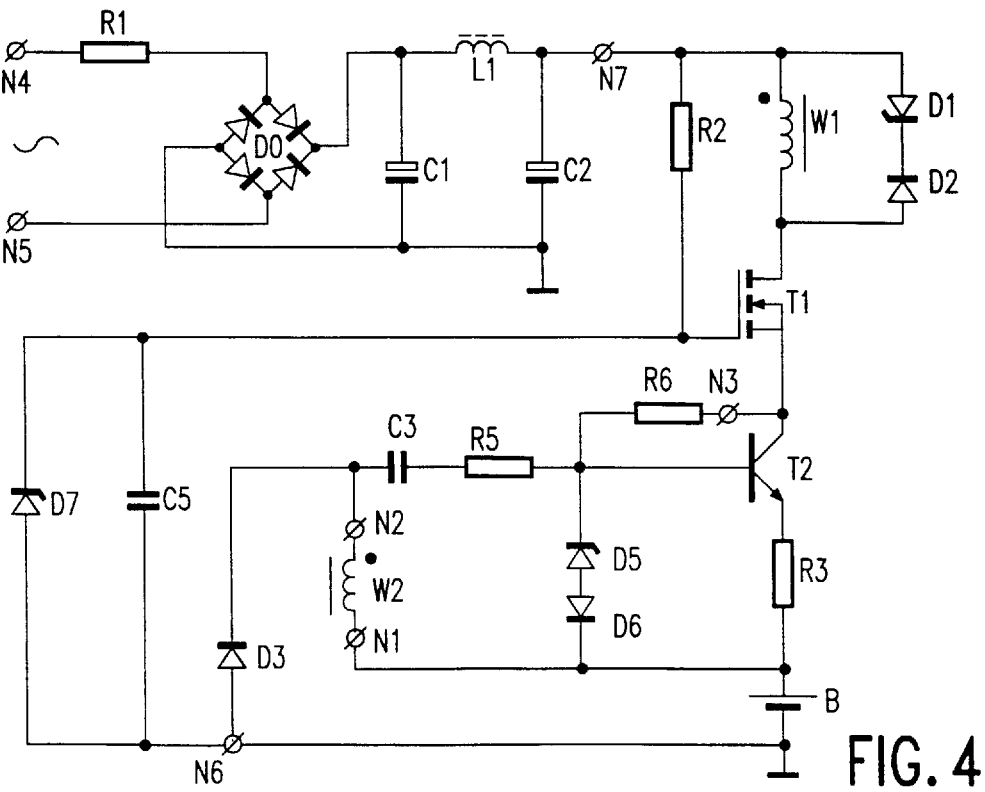
FIG. 4 shows a fourth embodiment of a power-supply circuit in accordance with the invention.

FIG. 4 shows a fourth embodiment in which the cascode transistor T1 comprises a MOS transistor. Since the gate of the transistor T1 draws hardly any current when this transistor is turned on, the diode D4 and the resistor R4 can be dispensed with. An optional capacitor C5 is connected across the zener diode D7 in order to cope with possible transients on the gate of the transistor T1. In contrast with the embodiments using a bipolar transistor T1, the zener diode D7 remains conductive when the switching transistor T2 is turned on. The voltage on the source electrode of the transistor T1 decreases when the switching transistor T2 is saturated. The increased gate-source voltage brings the transistor T1 into the desired state of conduction.

The diode D6 inhibits rapid charging of the third capacitor C3. The presence of this diode D6 enables the power-supply circuit to be switchable between a comparatively high repetition frequency and a comparatively low repetition frequency. By short-circuiting the diode D6 the negative voltage transient across the capacitor C3 can be compensated rapidly in the flyback interval because the zener diode D5 then operates as a diode poled in the forward direction. As a result of this, the base voltage of the switching transistor T2 more rapidly assumes the positive value which is adequate to drive the switching transistor T2 into conduction again. The repetition frequency of the oscillation cycle then becomes substantially higher, as a result of which the average value of the current supplied to the battery B or another load increases. By means of a switch across the diode D6 it is thus possible to change over from slow charging to rapid charging of the battery B. The switch can be a hand-operated electrical switch (not shown) or a transistor switch.

Figure 5:
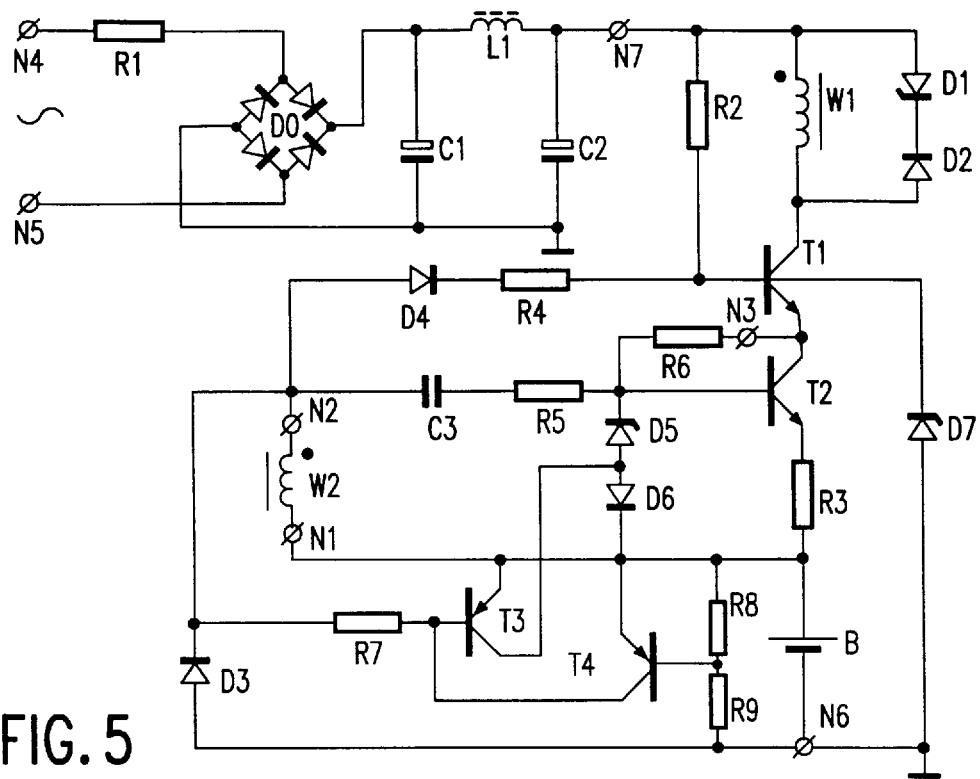
FIG. 5 shows a fifth embodiment of a power-supply circuit in accordance with the invention.

FIG. 5 shows a fifth embodiment having an electronic switch, which by way of example comprises an bipolar PNP transistor T3, having its emitter connected to the first terminal N1, its collector to the anode of the diode D6, and its base to the second terminal N2 via a current-limiting resistor R7. In the flyback interval the second terminal N2 is negative relative to the first terminal N1, as a result of which the transistor T3 is turned on and short-circuits the diode D6. In order to prevent the voltage of the battery B from increasing excessively and the battery B from being overcharged, there has been provided a battery voltage sensor and a switch which stops the drive to the transistor T3 if the battery voltage exceeds a given value. The voltage sensor takes the form of a voltage divider comprising the resistors R8 and R9, connected in series across the battery B. By way of example, the switch again comprises a PNP transistor having its emitter connected to the first terminal N1, its collector to the base of the transistor T3, and its base to the tap of the voltage divider. When the battery voltage exceeds a given value, the transistor T4 is turned on and the base-emitter junction of the transistor T3 is short-circuited. Instead of bipolar transistors it is also possible to use unipolar (MOS) transistors for the transistors T3 and T4. By means of a suitable interface circuit the transistor T4 can also be driven by a signal which is a measure of another battery condition, for example a signal responsive to the temperature of or the pressure in the battery to be charged. In the forward interval the transistor T3 is protected against an excessive base-emitter voltage by means of the resistor R7, the voltage divider R8, R9 and the conducting collector-base junction of the transistor T4.

Figure 6:
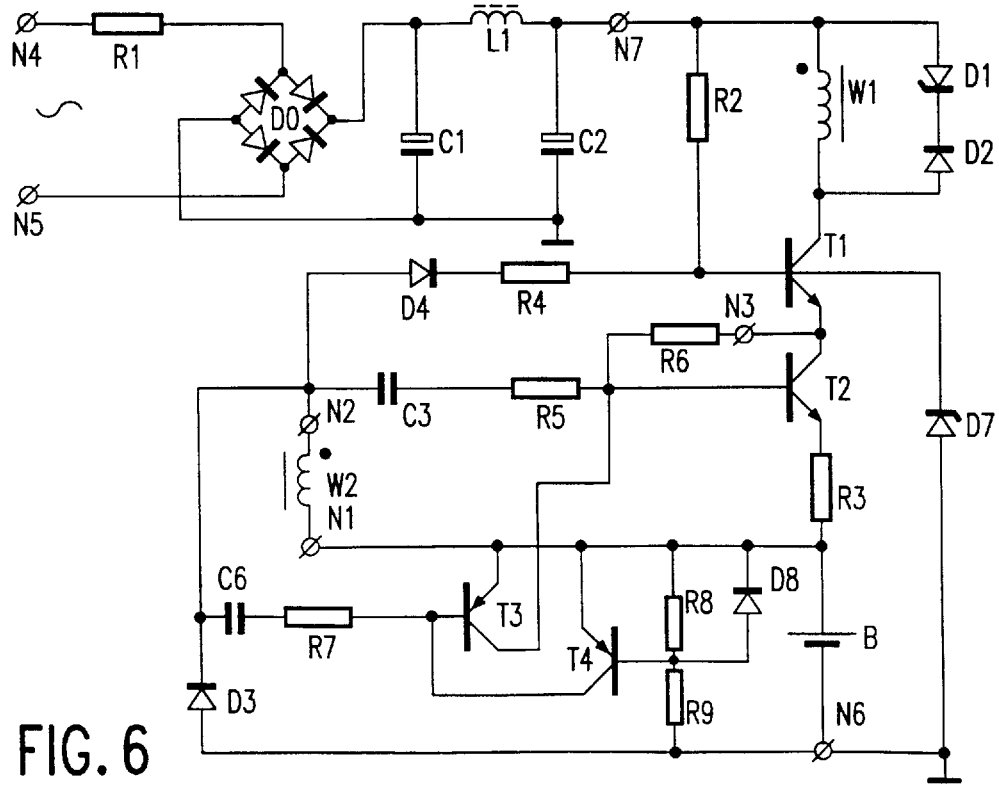
FIG. 6 shows a sixth embodiment of a power-supply circuit in accordance with the invention.
Figure 7:
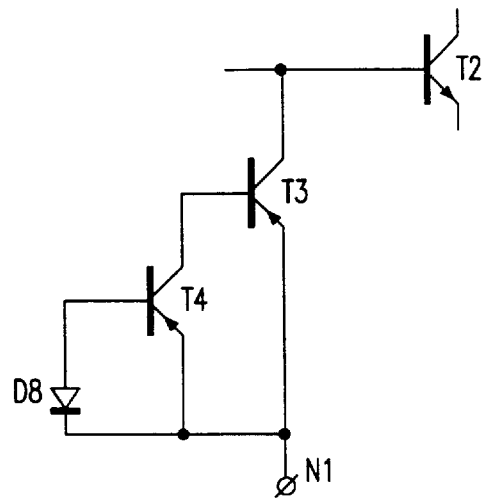
FIG. 7 shows a part of the sixth embodiment shown in FIG. 6.

The presence of the transistor T3 and the transistor T4 makes it possible to avoid the use of the zener diode D5 and the resulting variation in the cut-off point of the switching transistor T2. FIG. 6 shows a sixth embodiment without the zener diode D5. The diode D6 has also been dispensed with. The resistor R7 is now connected to the second terminal N2 via a capacitor C6. Moreover, a diode D8 is connected across the base-emitter junction of the transistor T4, the anode of the diode D8 being connected to the base of the transistor T4. FIG. 7 shows how the transistors T3 and T4 and the diode D8 operate in the forward interval. The collector-base junctions of both the transistor T3 and T4 are then conductive. The threshold voltage is then equal to the sum of three junction voltages (approximately 2.1 V). When their collector-base junctions conduct the transistors T3 and T4 will operate in the reverse mode, i.e. the collector operates as the emitter and the emitter as the collector. The internal resistance of the threshold element thus obtained depends inter alia on the current gain of the transistors in the reverse mode, which should therefore be adequate, particularly for the transistor T3. In the flyback interval the transistors T3 and T4 operate again as described for the embodiment shown in FIG. 5. The capacitor C6 prevents the starting current from being drained to the battery B via the collector-base junction of the transistor T3, the resistor R7 and the secondary winding.

Figure 8:
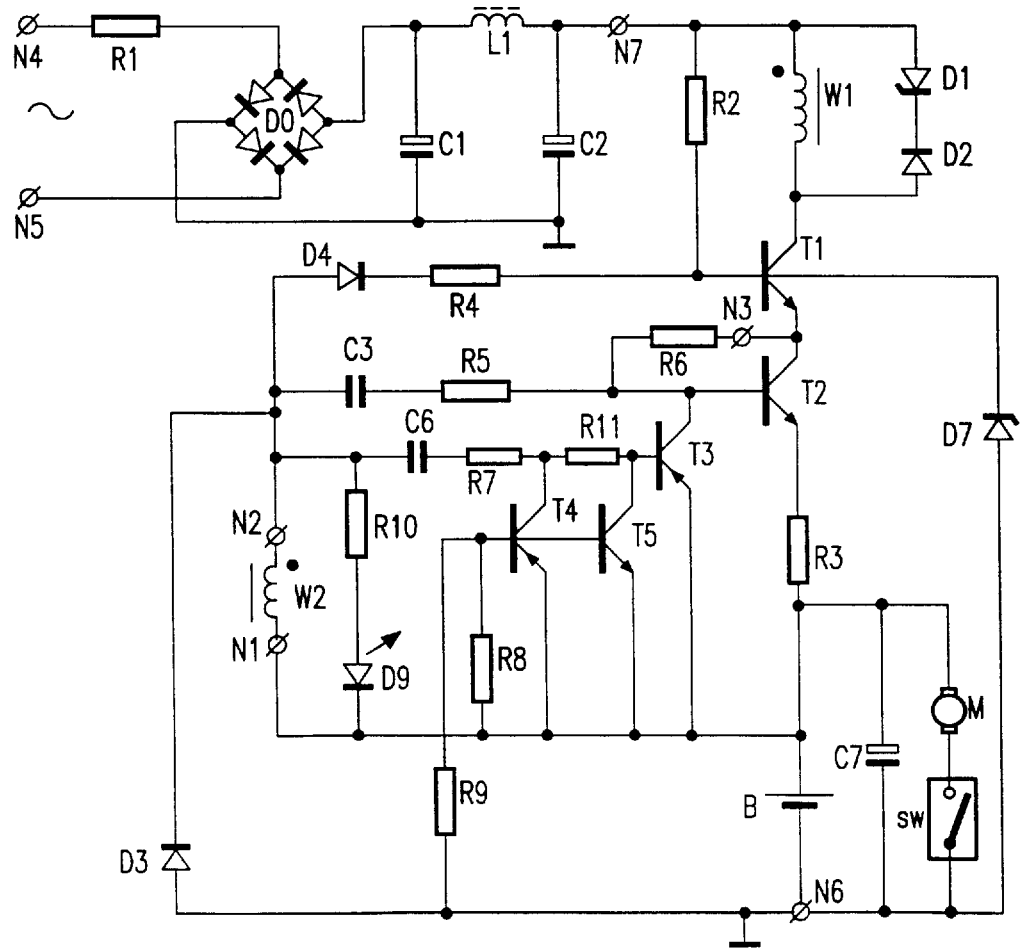
FIG. 8 shows a seventh embodiment of a power-supply circuit in accordance with the invention.
Figure 9:
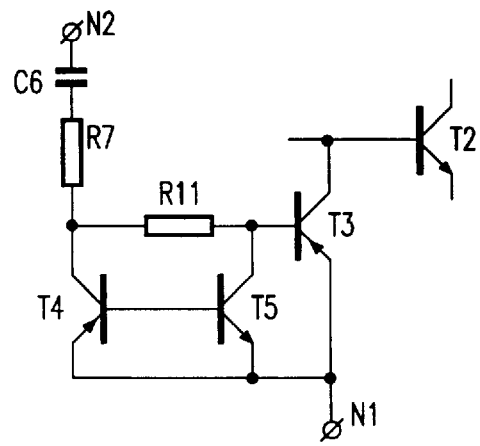
FIG. 9 shows a part of the seventh embodiment shown in FIG. 8.

FIG. 8 shows a seventh embodiment which enables the influence of the varying mains voltage to be compensated even further. The diode D8 of the circuit arrangement shown in FIG. 6 has been replaced by an NPN transistor T5 having its emitter connected to the first terminal N1, its collector to the base of the transistor T3, and its base to the base of the transistor T4. Furthermore, the transistor T4 has its collector connected to the base of the transistor T3 via a resistor R11. By means of the resistor R11 the degree of compensation can be adjusted. FIG. 9 illustrates the situation in the forward interval. The threshold voltage is the sum of the collector-base voltage of the transistor T3 and the collector-emitter voltage of the transistor T5. The voltage on the collector of the transistor T4, which is the sum of the collector-base voltage of the transistor T4 and the base-emitter voltage of the transistor T5, is maintained constant by the transistor T5 in that it withdraws just as much current from the collector of the transistor T4 as is supplied by the resistor R7. As a result, the voltage on the collector of the transistor T5 will decrease by a factor which is determined by the ratio between the resistors R11 and R7 and which is proportional to the current supplied by the resistor R7. Since the resistor R7 is connected to the second terminal N2 of the secondary winding W2 via the capacitor C6, the voltage on the collector of the transistor T5 decreases and increases as a linear function of the mains voltage. As a result, the turn-off instant of the switching transistor T2 varies proportionally to the mains voltage.

The capacitor C6 inhibits leakage of the starting current to the battery B via the collector-base junction of the transistor T3, the resistors R11 and R7 and the secondary winding W2. For the same reason, the resistor R7 has not been connected to the capacitor C3 to enable the capacitor C4 to be dispensed with, because then the starting current would leak away via the resistor R7, the collector-base junction of the transistor T4 and the resistor R8. As the average voltage across the secondary winding W2 is zero and the impedances of the charging and discharging path for the capacitor C6 are substantially equal, the average voltage across the capacitor C6 will also be substantially zero. If the time constant of the resistor R7 and the capacitor C6 is large relative to the switching cycle time, the influence of the capacitor C4 on the mains voltage compensation will be negligible. However, it appears that even in the case of a small time constant the mains voltage compensation is still satisfactorily adjustable.

FIG. 8 further shows a motor M, which can be connected to the battery B by means of a switch SW. Moreover, a smoothing capacitor C7 has been provided for additional interference suppression. The motor M can be the motor of a shaver comprising rechargeable batteries, which are charged from the mains voltage. Operation of the power-supply circuit is indicated by means of a LED D9, which is connected to the terminals N1 and N2 of the secondary winding W2 by a series resistor R10.

Figure 10A:
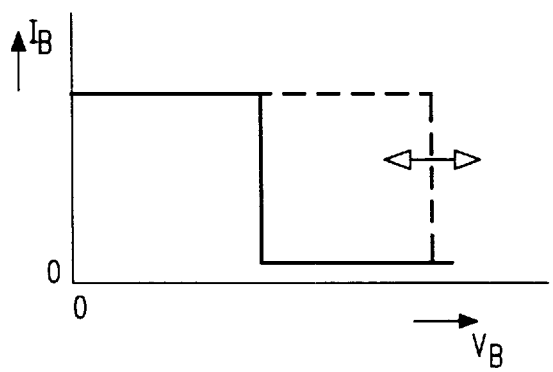
FIGS. 10A and 10B are diagrams to explain the operation of control functions in an embodiment of a power-supply circuit in accordance with the invention.
Figure 11:
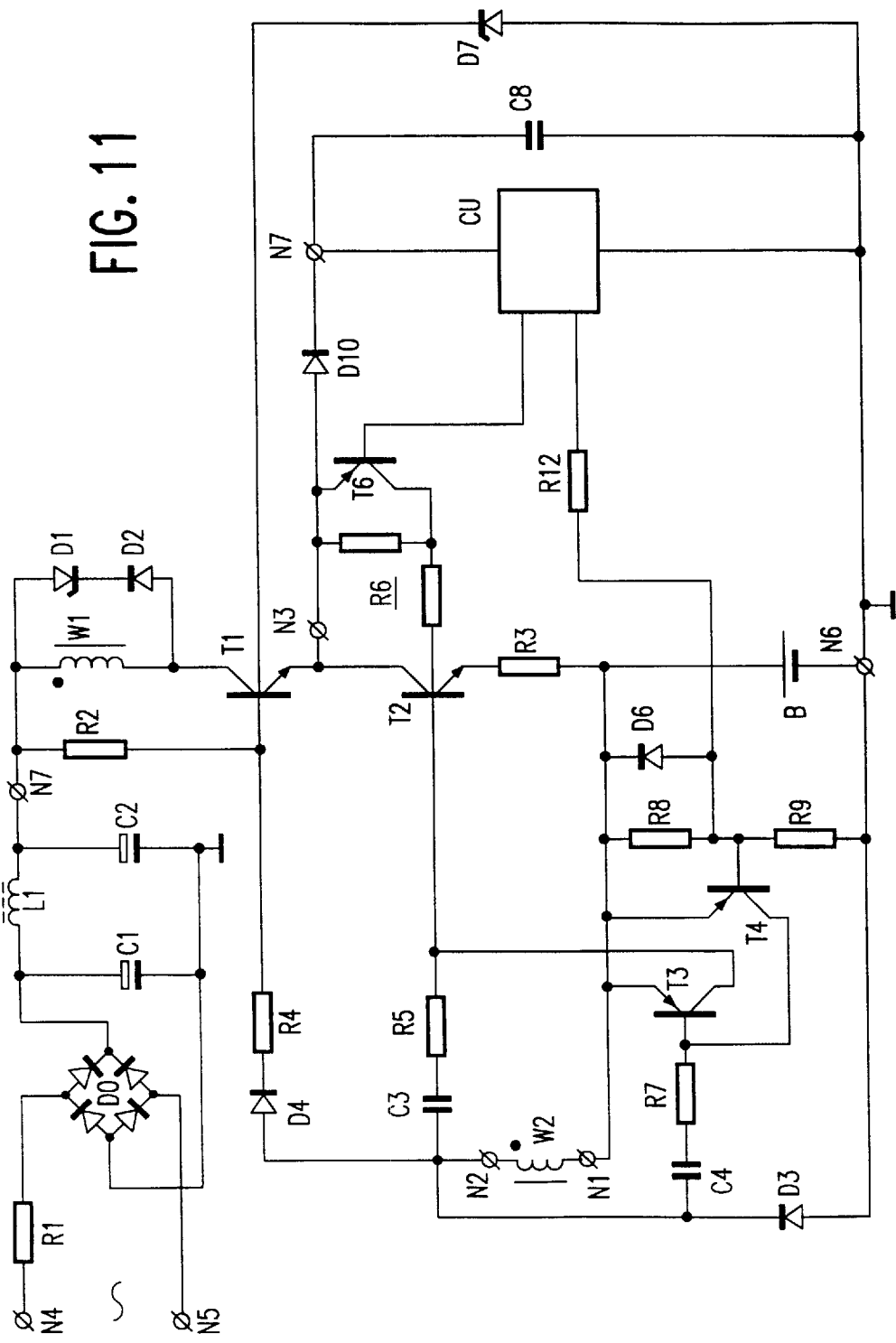
FIG. 11 shows an eighth embodiment of a power-supply circuit in accordance with the invention.

The change-over point from rapid charging to slow charging and vice versa can be influenced in various manners. FIG. 10A illustrates a first method, which is based on influencing of the battery voltage measured by means of the voltage divider R8, R9. The average charging current $I_B$ through the battery is then changed over from a high to a low value at another battery voltage $V_B$. FIG. 11 shows a eighth embodiment comprising a control unit CU, which varies the voltage on the tap of the voltage divider R8, R9 via a resistor R12. The control unit can effect this in response to various parameters, such as the temperature of the battery, rotation or non-rotation of the motor M (not shown in FIG. 11), the voltage variation of the battery during charging, the elapsed time, or on the basis of any other form of battery management.

Figure 10B:
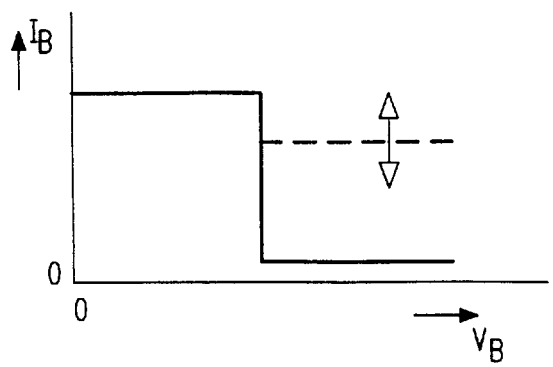

However, It is also possible to vary the value of the resistor R6, as a result of which the comparatively small slow-charging current is increased to a comparatively large rapid-charging current, as illustrated in FIG. 10B. For this purpose the resistor R6 in FIG. 11 has been split into two resistors, of which one resistor can be short-circuited by means of a transistor T6, which is controlled by the control unit CU. The transistor T6 can be turned on and turned off by means of a digital control signal in order to change over the resistance value of the resistor R6, or by means of an analog signal in order to enable the resistance to be modulated.

The control unit receives its supply voltage from a supply terminal N7, which is connected to the supply terminal N3 via a diode D4 and to ground via a smoothing capacitor C8. The diode D10 is cut off when the switching transistor T2 conducts and prevents the smoothing capacitor C8 from being discharged. Since the transistor T1 forms an active buffer for the stabilized voltage on its base, the smoothing capacitor C4 can be comparatively small.

Figure 12:
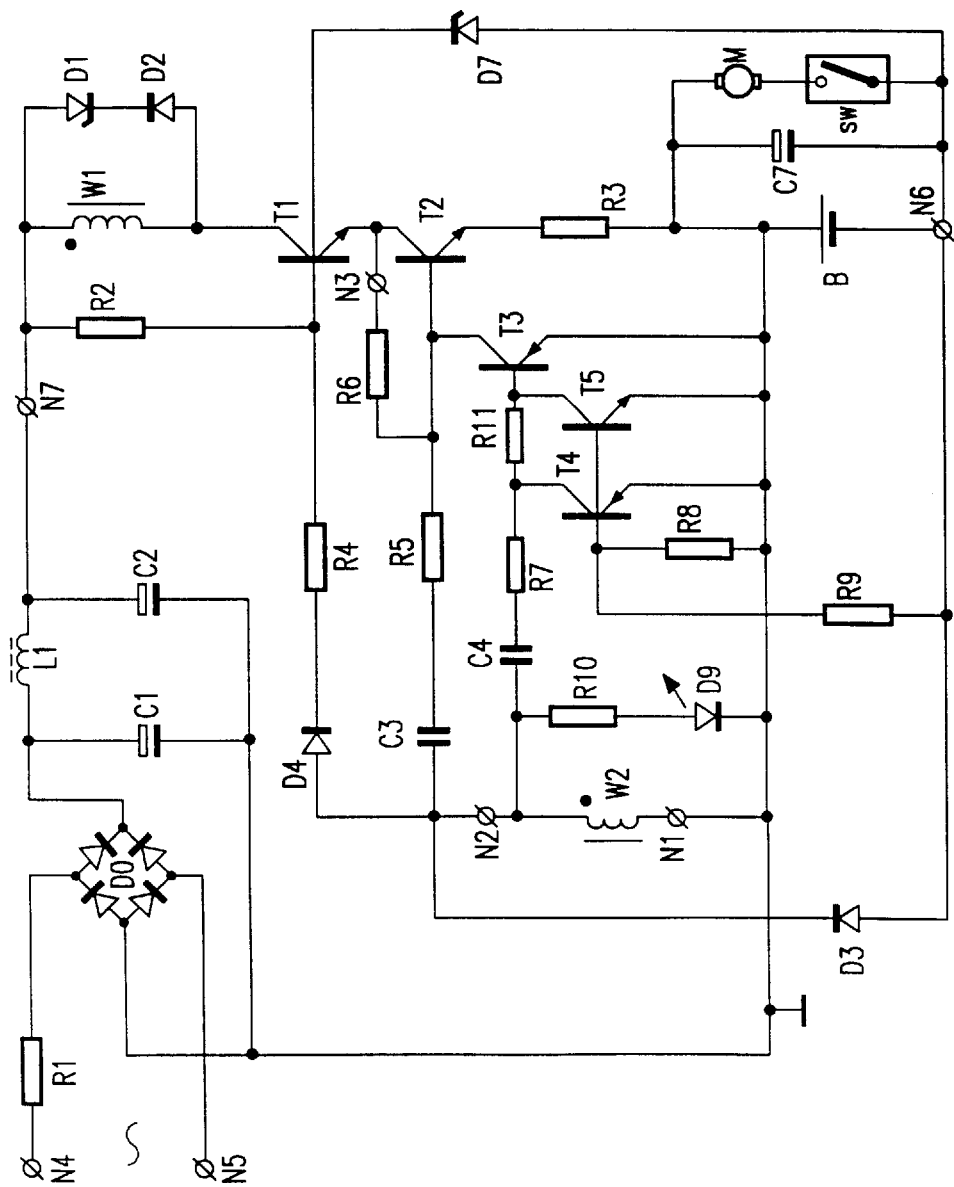
FIG. 12 shows a ninth embodiment of a power-supply circuit in accordance with the invention.

FIG. 12 shows a ninth embodiment in which the positive terminal of the battery B instead of the negative terminal of the battery B is connected to ground. By way of example this has been applied to the seventh embodiment shown in FIG. 8, but any other one of the embodiments described hereinbefore can be modified accordingly. The result is that the current through the primary winding W1 no longer flows through the battery B and the load. Likewise, the anode of the zener diode D7 may at option be connected to the positive terminal or negative terminal of the battery B. However, the previously described protection against an interrupted or missing battery, operates only if the zener diode D7 has been connected to the negative terminal of the battery B.

Figure 13:
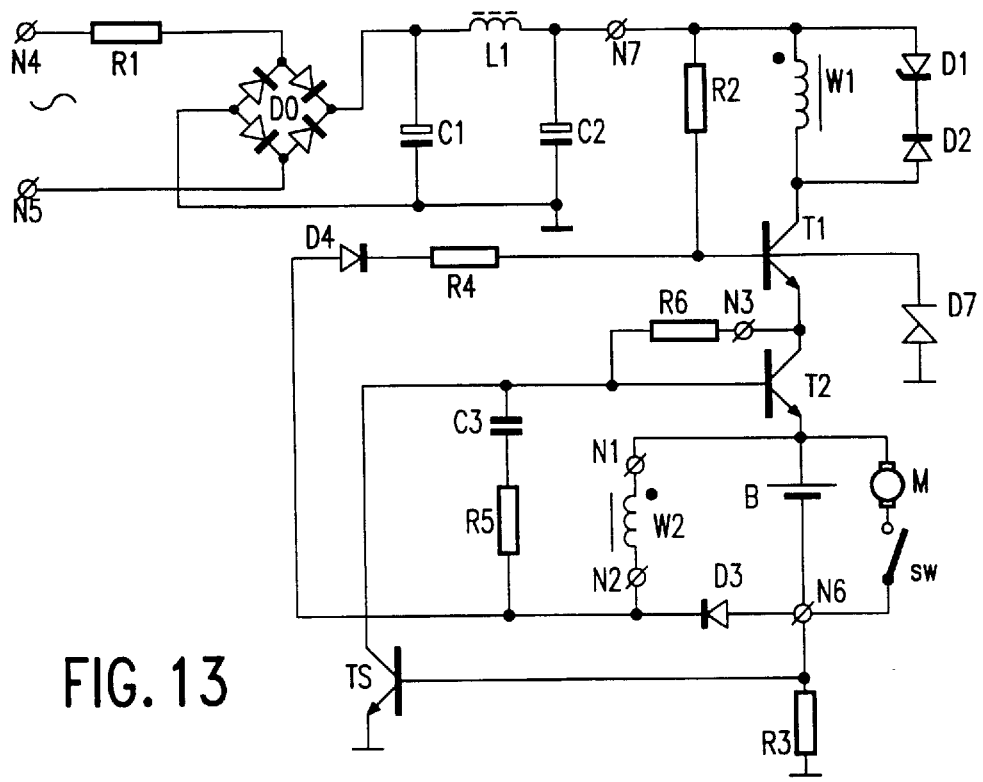
FIG. 13 shows a tenth embodiment of a power-supply circuit in accordance with the invention.

FIG. 13 shows a tenth embodiment which is largely identical to that shown in FIG. 1. However, the zener diode D5 and the diode D6 have been dispensed with, the first terminal 1 is connected directly to the emitter of the switching transistor T2 and the resistor R3 is now connected between the terminal N6 and ground. Furthermore, an NPN transistor TS has been added, which transistor has its emitter connected to ground, its base to the terminal N6, and its collector to the base of the switching transistor T2. The increasing current through the resistor R3 in the forward interval produces an increasing voltage difference across the resistor R3. As soon as this voltage difference exceeds the base-emitter junction threshold voltage of the transistor TS, the transistor TS is turned on and pulls the base of the switching transistor T2 to ground, as a result of which the switching transistor T2 is turned off. Further, the operation of this embodiment is as described with reference to FIG. 1. If desired, the resistor may be switchable or variable, as indicated in FIG. 11.

Figure 14:
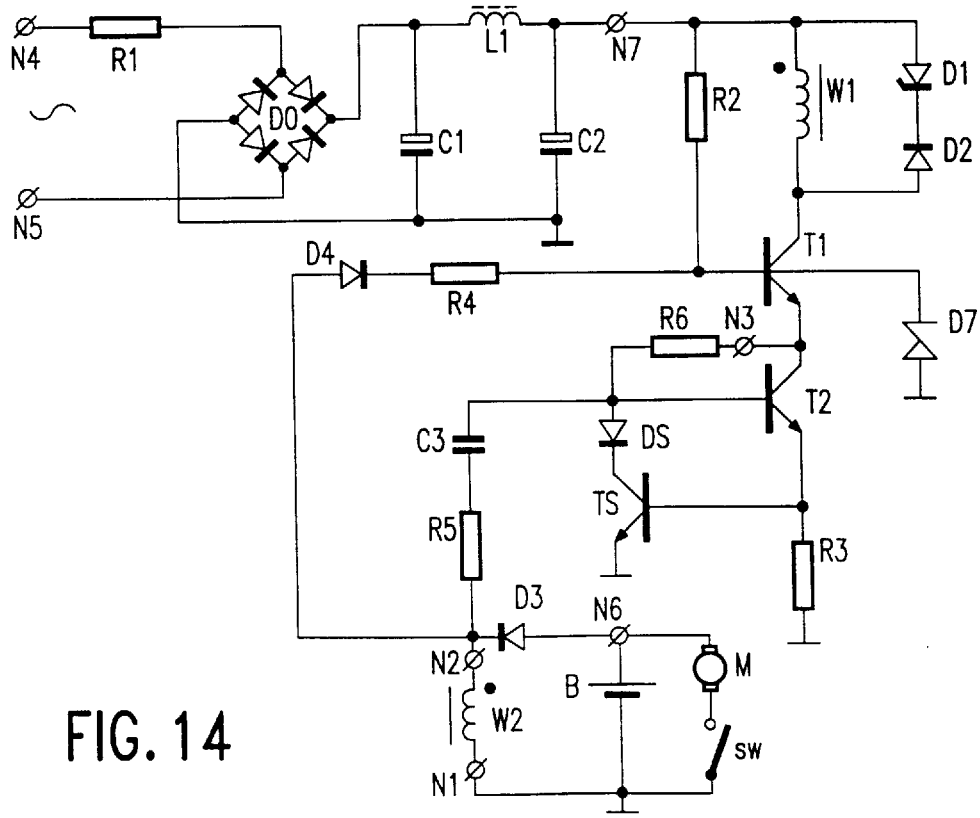
FIG. 14 shows an eleventh embodiment of a power-supply circuit in accordance with the invention.

FIG. 14 shows a variant of the embodiment shown in FIG. 13. The load B in FIG. 14 is not included in the primary circuit. The resistor R3 is connected between the emitter of the switching transistor T2 and ground. A diode Ds in series with the collector of the transistor TS prevents the capacitor C3 from being discharged via the collector-base junction of the transistor TS and the resistor R3.

Figure 15:
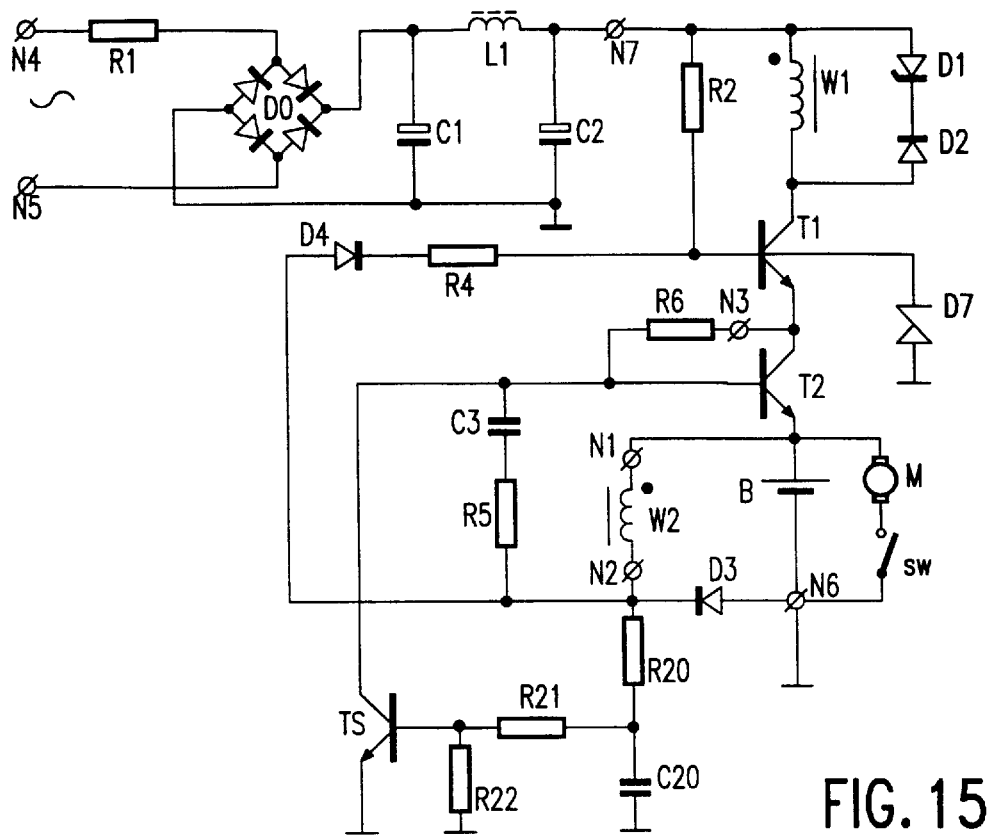
FIG. 15 shows a twelfth embodiment of a power-supply circuit in accordance with the invention.

FIG. 15 shows a twelfth embodiment which does not employ a resistor R3 to measure the primary current. The circuit shown in FIG. 15 is largely identical to that shown in FIG. 13. However, the terminal N6 is connected directly to ground. The control signal for the activation of the transistor TS is obtained by integrating the voltage on the second terminal N2 during the forward interval, when the transformed input voltage appears across the secondary winding W2. The integrator further comprises a series arrangement of a resistor R20 and a capacitor C20 between the second terminal N2 and ground. The node between the resistor R20 and the capacitor C20 is connected to the base of the transistor TS via a voltage divider R21/R22.

Figure 16:
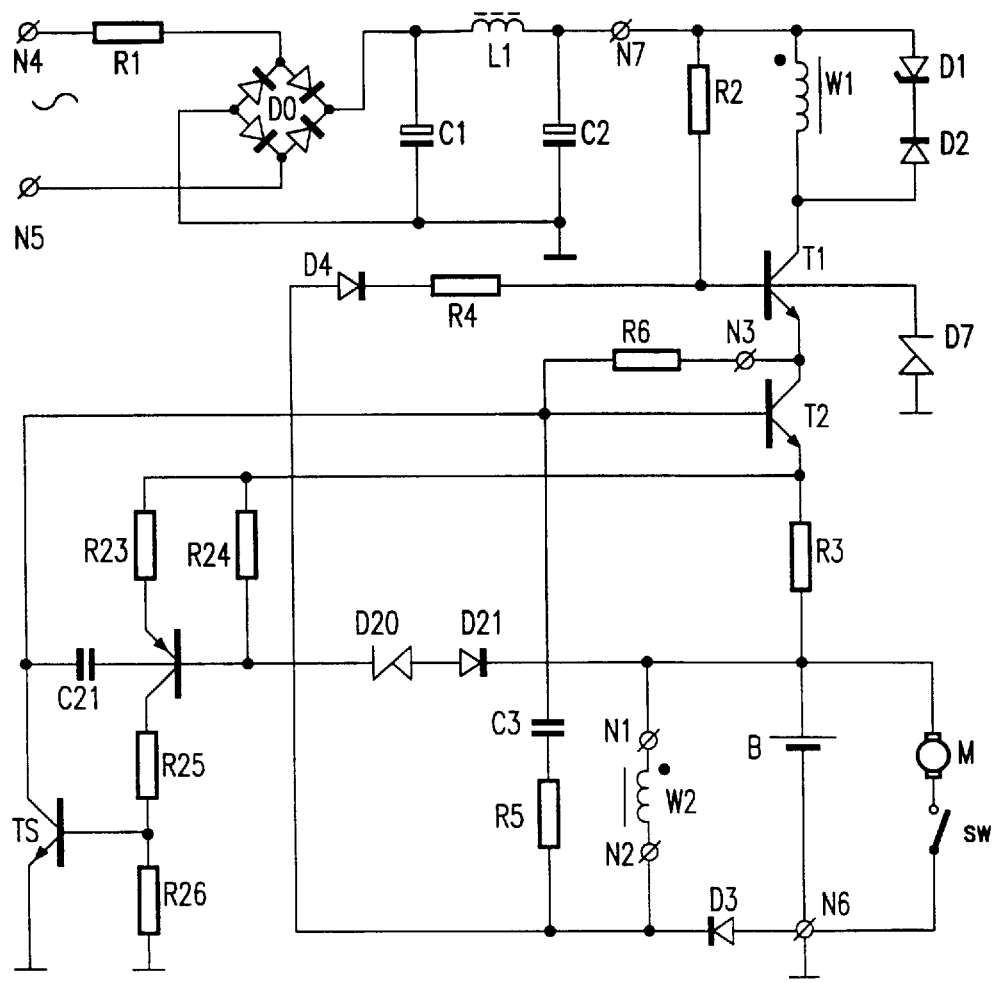
FIG. 16 shows a thirteenth embodiment of a power-supply circuit in accordance with the invention.

FIG. 16 shows a thirteenth embodiment which is again largely identical to that shown in FIG. 1. However, the zener diode D5 and the diode D6 have been dispensed with. Instead of these elements an NPN transistor TS has been added, which transistor has its emitter connected to ground and its collector to the base of the switching transistor T2. The base of the transistor TS is connected to ground via a resistor R26 and to the collector of a transistor TD via a resistor R25, which transistor TD has its emitter connected to the emitter of the switching transistor T2 via a resistor R23 and its base to the first terminal N1 via a series arrangement of a zener diode D20 and a diode D21. Moreover, the base of the transistor TD is connected to the emitter of the switching transistor T2 via a resistor R24.

In the case of an increasing voltage across the resistor R3 the zener diode D20 will eventually break down and keep the voltage on the base of the transistor TD constant. In the case of an even further increase the voltage drop across the resistor R24 will turn on the transistor TD. The collector current of the transistor TD drives the transistor TS via the resistors R25 and R26, which transistor TS short-circuits the base of the switching transistor T2 to ground. The switching action of the transistor TS is accelerated by means of positive feedback via a capacitor C21 between the collector of the transistor TS and the base of the transistor TD.

Figure 17:
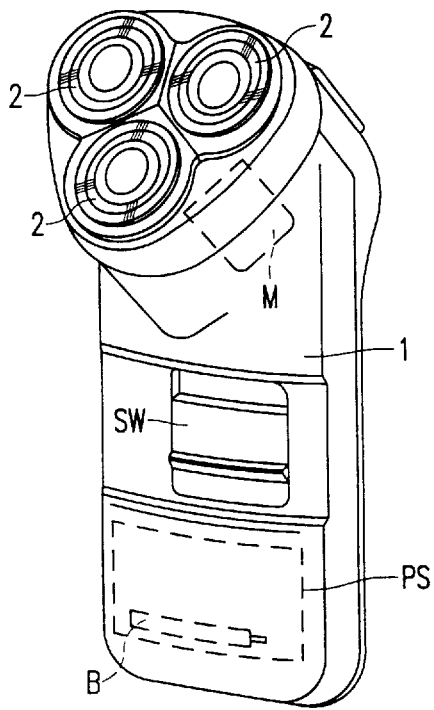
FIG. 17 shows an electric shaver comprising a power-supply circuit in accordance with the invention.

FIG. 17 shows an electric shaver having a housing 1, which accommodates the power-supply circuit PS, the battery B and the motor M. The motor drives the shaver heads 2 and is operated by means of the switch SW.

I claim:

1. A power-supply circuit for powering a load (B) from an input voltage, which circuit comprises:

a transformer having a primary winding (W1) and a secondary winding (W2), a switching transistor (T2) having a control electrode and having a first main electrode and having a second main electrode which define a main current path of the switching transistor (T2), which main current path is connected to the input voltage in series with the primary winding (W1) to pass a current through the primary winding;

means for turning off the switching transistor if the current exceeds a predetermined value;

a first diode (D3) connected, in series with the load (B) to be powered, between a first terminal (N1) of the secondary winding (W2) and a second terminal (N2) of the secondary winding (W2), the load (B) to be powered being connected to the first terminal (N1) and the first diode (D3) being connected to the second terminal (N2);

a series arrangement of a capacitor (C3) and a first resistor (R5), which series arrangement is connected between the second terminal (N2) and the control electrode; and a second resistor (R6) connected between the control electrode and a supply terminal (N3), characterized in that the circuit further comprises:

a further transistor (T1) having a first main electrode coupled to the second main electrode of the switching transistor (T2) in series and to the second resistor (R6), a second main electrode coupled to the primary winding (W1), and a control electrode connected to receive a voltage which is stabilized with respect to variations in the input voltage.

2. A power-supply circuit as claimed in claim 1, characterized in that the means for turning off comprise:

a sensing resistor (R3), arranged in series with the main current path of the switching transistor (T2); and a further switching transistor (TS), having a main current path connected between the control electrode of the switching transistor (T2) and a point of fixed potential, and having a control electrode connected to receive a control signal in response to a voltage difference across the sensing resistor (R3).

3. A power-supply circuit as claimed in claim 1, characterized in that the means for turning off comprise:

an integrator (R20, C20 R21, R22), coupled to the second terminal (N2) in order to generate an integrated signal;

a further switching transistor (TS), having a main current path connected between the control electrode of the switching transistor (T2) and a point of fixed potential, and having a control electrode connected to receive the integrated signal.

4. A power-supply circuit as claimed in claim 1, characterized in that the means for turning off comprise:

a sensing resistor (R3), arranged in series with the first main electrode of the switching transistor (T2); and a threshold element (D5) to limit the voltage on the control electrode, the threshold element (D5) being connected between the control electrode and the first terminal (N1).

5. A power-supply circuit as claimed in claim 4, characterized in that a second diode (D6) is arranged in series with the threshold element (D5), which second diode conducts during limitation of the voltage on the control electrode of the switching transistor (T2).

6. A power-supply circuit as claimed in claim 5, characterized in that a switch (T3) is connected in parallel with the second diode (D6) to short-circuit the second diode (D6).

7. A power-supply circuit as claimed in claim 6, characterized in that the power-supply circuit further comprises means (CU, R12, R8, R9, T4) for opening and closing the switch (T3) in response to a signal which is a measure of a condition of the load (B) to be powered.

8. A power-supply circuit as claimed in claim 7, characterized in that the second diode (D6) has a first electrode connected to the first terminal (N1) of the secondary winding (W2) and has a second electrode connected to the threshold element, and the switch comprises:

a first transistor (T3) having a first main electrode connected to the first terminal (N1), a second main electrode coupled to the second electrode of the second diode (D6), and a control electrode coupled to the second terminal (N2) of the secondary winding (W2);

a second transistor (T4) having a first main electrode connected to the first terminal (N1), a second main electrode coupled to the control electrode of the first transistor (T3), and a control electrode; and a voltage divider (R8, R9), connected across the load (B) to be powered and having a tap connected to the control electrode of the second transistor (T4).

9. A power-supply circuit as claimed in claim 4, characterized in that the threshold element comprises:

a first bipolar transistor (T3) having an emitter connected to the first terminal (N1), a collector coupled to the control electrode of the switching transistor (T2), and a base coupled to the second terminal (N2) of the secondary winding (W2);

a second bipolar transistor (T4) having an emitter connected to the first terminal (N1), a collector coupled to the base of the first bipolar transistor (T3), and a base connected to the first terminal (N1) via a diode (D8); and the power-supply circuit further comprises:

a voltage divider (R8, R9), connected across the load (B) to be powered and having a tap connected to the base of the second bipolar transistor (T4).

10. A power-supply circuit as claimed in claim 4, characterized in that the threshold element comprises:

a first bipolar transistor (T3) having an emitter connected to the first terminal (N1), a collector coupled to the control electrode of the switching transistor (T2), and a base coupled to the second terminal (N2) of the secondary winding (W2) via a series resistor (R11);

a second bipolar transistor (T4) having an emitter connected to the first terminal (N1), a collector connected to the base of the first bipolar transistor (T3) via the series resistor (R11), and a base, a third bipolar transistor (T5) of an opposite conductivity type, having an emitter connected to the first terminal (N1), a collector coupled to the base of the first bipolar transistor (T3), and a base; and the power-supply circuit further comprises:

a voltage divider (R8, R9), connected across the load (B) to be powered and having a tap connected to the base of the second bipolar transistor (T4) and to the base of the third bipolar transistor (T5).

11. A power-supply circuit as claimed in claim 8, wherein the power-supply circuit comprises means (CU, R12) for influencing the voltage on the tap of the voltage divider (R8, R9).

12. A power-supply circuit as claimed in claim 4, wherein the control electrode of the further transistor (T1) is connected to receive the input voltage via a resistor (R2) and is connected to a node (N6) between the load (B) to be powered and the first diode (D3) via a further threshold element (D7).

13. A power-supply circuit as claimed in claim 4, wherein the threshold element comprises a zener diode (D5).

14. A power-supply circuit as claimed in claim 13, characterized in that the threshold element comprises:
a further series resistor (R7), connected between the series arrangement of the first capacitor (C3) and the first resistor (R5) and the control electrode of the switching transistor (T2);
a first zener diode (D5), connected to the control electrode of the switching transistor (T2); and
a second zener diode (D8), connected to the control electrode of the switching transistor (T2) via the further series resistor (R7).

15. A power-supply circuit as claimed in claim 13, characterized in that the threshold element comprises:
a series arrangement of a zener diode (Z) and a further series resistor (Rs), and a bipolar transistor (TN) having a base connected to a node coupling the zener diode (Z) and the further series resistor (Rs), and having a main current path arranged in parallel with the series arrangement of the zener diode (Z) and the further series resistor (Rs).

16. A power-supply circuit as claimed in claim 1, wherein a second capacitor (C5) is arranged in parallel with the second resistor (R5).

17. A power-supply circuit as claimed in claim 1, wherein the power-supply circuit further comprises:
a series arrangement of a diode (D4) and a resistor (R4), which series arrangement is connected between the control electrode of the further transistor (T1) and the second terminal (N2) of the secondary winding (W2).

18. A power-supply circuit as claimed in claim 1, at least a part of the second resistor (R6) comprises a variable or adjustable resistor.

19. A power-supply circuit as claimed in claim 1, wherein the control electrode of the further transistor (T1) is connected to receive the input voltage via a resistor (R2) and is connected to a point of fixed potential via a further threshold element.

20. A power-supply circuit as claimed in claim 19, characterized in that the further threshold element comprises a zener diode (D7).

21. A power-supply circuit as claimed in claim 1, wherein the power-supply circuit further comprises: a diode (D10) connected between the first main electrode of the further transistor (T1) and a further supply terminal (N7), and a smoothing capacitor (C8) connected to the further supply terminal (N7).

22. An electric shaver comprising:
a rechargeable battery (B) providing an input voltage, an electric motor (M), a switch (SW) for connecting the motor (M) to the battery (B), and a power-supply circuit (PS) for charging the battery, which circuit comprises:
a transformer having a primary winding (W1) and a secondary winding (W2), a switching transistor (T2) having a control electrode and having a first main electrode and having a second main electrode which define a main current path of the switching transistor (T2), which main current path is connected to the input voltage in series with the primary winding (W1) to pass a current through the primary winding;
means for turning off the switching transistor if the current exceeds a predetermined value;
a first diode (D3) connected, in series with the battery (B), between a first terminal (N1) of the secondary winding (W2) and a second terminal (N2) of the secondary winding (W2), the battery (B) being connected to the first terminal (N1) and the first diode (D3) being connected to the second terminal (N2);
a series arrangement of a capacitor (C3) and a first resistor (R5), which series arrangement is connected between the second terminal (N2) and the control electrode; and
a second resistor (R6) connected between the control electrode and a supply terminal (N3), characterized in that the circuit further comprises:
a further transistor (T1) having a first main electrode coupled to the second main electrode of the switching transistor (T2) in a series and to the second resistor (R6), a second main electrode coupled to the primary winding (W1), and a control electrode connected to receive a voltage which is stabilized with respect to variations in the input voltage.

23. A power supply circuit as in claim 1 wherein said switching transistor and said further transistor are bipolar transistors, each said first main electrode being an emitter and each said second main electrode being a collector.

* * * * *